US005350442A

United States Patent [19]

[11] Patent Number: 5,350,442

[45] Date of Patent: Sep. 27, 1994

Thelen et al.

[54] GAS HANDLING SYSTEM AND ADSORBENT DRYER REGENERATION APPARATUS

[75] Inventors: John E. Thelen, Ocala; Sundar R. Mylavarapu, Gainesville, both of Fla.

[73] Assignee: Pneumatic Products Corp., Ocala, Fla.

[21] Appl. No.: 103,002

[22] Filed: Aug. 6, 1993

[51] Int. Cl.[5] .......... B01D 53/04

[52] U.S. Cl. .......... 95/115; 95/15; 95/17; 95/18; 95/124; 96/112; 96/113; 96/117; 96/128; 96/133; 55/356

[58] Field of Search .......... 95/10, 11, 17–19, 95/114, 115, 117, 123–126; 96/112, 113, 117, 128, 133, 144; 55/356

[56] References Cited

U.S. PATENT DOCUMENTS

| | | | |
|---|---|---|---|
| 2,345,774 | 4/1944 | Simpson | 95/123 X |
| 2,588,296 | 3/1952 | Russell, Jr. | 96/128 X |
| 2,665,769 | 1/1954 | Walker et al. | 95/124 X |
| 2,995,203 | 8/1961 | Maurer | 55/29 |
| 3,016,978 | 1/1962 | Hull | 96/113 |
| 3,222,849 | 12/1965 | Fischer | 96/112 |
| 3,384,976 | 5/1968 | Westeren | 96/144 X |
| 4,168,149 | 9/1979 | Armond et al. | 55/21 |
| 4,437,813 | 3/1984 | Ingram | 417/53 |
| 4,490,985 | 1/1985 | Wells | 62/86 |
| 4,505,127 | 3/1985 | Pronovost et al. | 62/271 |
| 4,552,570 | 11/1985 | Gravatt | 95/10 |
| 4,701,188 | 10/1987 | Mims | 95/18 |
| 4,726,818 | 2/1988 | Yeung et al. | 55/33 |
| 4,749,384 | 6/1988 | Nowobilski et al. | 95/114 |
| 4,761,968 | 8/1988 | Basseen et al. | 95/123 X |
| 4,790,860 | 12/1988 | Sexton | 95/125 |
| 4,968,333 | 11/1990 | Ellis et al. | 55/356 X |
| 5,121,609 | 6/1992 | Cieslukowski | 62/50.4 |

OTHER PUBLICATIONS

S. Mylavarapu, "Are High Presure Dessicant Dryers Right for Drying CNG Used in NGVs?" (Nov. 1991).

J. Thelen et al., "Towards Better Gas Quality Standards" (Feb. 1991).

CNG Series, "Captive Blower Purge Purification Systems" (Mar. 1991).

Xebec NGV Dryers (34 pages), May 1992.

Letter to J. Wroblewski dated Feb. 12, 1992.

Memo to regional managers dated Sep. 3, 1992.

Regional Manager Report (Sep. 14, 1992).

Letter to A. Razavi dated Mar. 31, 1992 (2 pages).

*Primary Examiner*—Robert Spitzer

*Attorney, Agent, or Firm*—Dickstein, Shapiro & Morin

[57] ABSTRACT

A mobile regeneration apparatus is provided for regenerating dryers. The regeneration apparatus may be used to regenerate single tower desiccant dryers located at natural gas vehicle refueling stations. For optimum performance, each dryer may be located upstream of a respective compressor.

20 Claims, 8 Drawing Sheets

GAS HANDLING SYSTEM AND ADSORBENT DRYER REGENERATION APPARATUS

BACKGROUND OF THE INVENTION

The present invention relates to a system for handling compressed gas. The invention also relates to a distribution system for supplying compressed natural gas to natural gas vehicles.

Natural gas (with methane as a major constituent) is typically supplied to end use installations at a relatively low pressure. For example, natural gas supplied through a pipeline is typically maintained at a pressure within a range of from five pounds per square inch (psig) to three hundred psig. However, at a natural gas vehicle refueling station, it may be desirable to store natural gas in compressed form at a high pressure. In particular, it may be advantageous to store the gas in uninsulated storage vessels at a pressure within a range of from about thirty-six hundred to about five thousand psig.

However, natural gas from a pipeline generally has a high moisture content. Natural gas supplied in bulk may have a moisture content within a range of seven pounds of water per million cubic feet of gas (lbs/MMScf) to one hundred lbs/MMScf. When such wet gas is compressed from its low pipeline pressure to a high storage pressure, its dew point increases significantly.

For example, natural gas with a moisture content of seven lbs/MMScf, when pressurized to a storage pressure of thirty-six hundred psig, will have a dew point of about fifty-two degrees Fahrenheit. This is a problem because it is of course desirable to locate natural gas vehicle refueling stations in cold climates where uninsulated storage vessels would encounter temperatures far below fifty-two degrees Fahrenheit. When the temperature of a compressed gas drops below its pressure dew point (in this example, fifty-two degrees Fahrenheit), the moisture within the gas condenses out as liquid water. Condensed water will promote corrosion, especially in the presence of other impurities like carbon dioxide and hydrogen sulfide. Liquid water is also disadvantageous because it displaces gas and thereby reduces storage capacity. Also, if the temperature within the system were to fall below thirty-two degrees Fahrenheit, the water would freeze, disrupting or even blocking gas flow through the system.

To avoid condensation and freezing problems, natural gas handled at a refueling station should be dried to a pressure dew point that is less than the minimum temperature to which the gas is likely to be exposed. For example, if the lowest expected winter temperature for the refueling station is zero degrees Fahrenheit, then the gas should be dried to a pressure dew point within the range of from minus ten to minus twenty degrees Fahrenheit at thirty-six hundred psig. To achieve a pressure dew point of minus twenty degrees Fahrenheit at thirty-six hundred psig, the natural gas would have to be dried to about four-tenths of one pound of water per million cubic feet of gas.

Therefore, there is a need for an economical and effective system for dehydrating natural gas at vehicle refueling stations (and at other installations).

Systems for dehydrating natural gas have been developed. Of particular interest are dryers which contain desiccant material for removing water by adsorption. Prior art desiccant dryers for dehydrating natural gas are disclosed by U.S. Pat. Nos. 4,701,188 (Mims), 4,505,127 (Pronovost et al.), and 2,588,296 (Russel, Jr.). However, the prior art dryer systems have not been successfully employed at end user installations, and would not be satisfactory for use at natural gas vehicle refueling stations.

SUMMARY OF THE INVENTION

The present invention overcomes the problems of the prior art by providing a mobile regeneration apparatus for regenerating adsorbent dryers.

In one aspect of the invention, natural gas vehicle refueling stations are each provided with a single tower desiccant dryer, and a single mobile regeneration apparatus is used to regenerate each of the dryers. The use of single tower dryers is particularly advantageous for refueling stations that operate at low flow rates. At such low flow rate stations, the cost and complexity of a traditional twin tower desiccant dryer system may not be justified.

In another aspect of the invention, the mobile regeneration apparatus includes a blower for circulating regenerating fluid (such as nitrogen) through a desiccant dryer, a cooler for cooling the regenerating fluid, and a separator for removing water from the regenerating fluid.

In another aspect of the invention, the regeneration apparatus is compact and relatively light weight, so as to be readily transportable to each of the refueling stations. In a preferred embodiment of the invention, the regeneration apparatus is mounted on a durable, portable skid.

In a preferred embodiment of the invention, the regeneration apparatus has a self-contained control system. A control panel may be provided for accessing and monitoring the control system. The control system may be fully automated such that regenerating and cooling phases are performed automatically, and such that the apparatus is shut down automatically in the event of an operational difficulty.

An object of the invention is to provide an effective and relatively uncomplicated apparatus for in-field regeneration of the adsorbent media contained within desiccant dryers.

Another object of the invention is to provide a cost effective system for maintaining low dew point performance of natural gas dryers. In one embodiment of the invention, a desiccant drier may be employed to dry natural gas to a pressure dew point of minus one hundred degrees Fahrenheit, so that condensation of water is avoided in even the coldest climates.

Another object of the invention is to provide a completely self-contained regeneration apparatus.

Another object of the invention is to provide a practical and cost effective system for operating a natural gas distribution system that includes low flow refueling stations.

Other objects and advantages of the present invention will become apparent from the following detailed description and drawings which illustrate preferred embodiments of the invention.

DETAILED DESCRIPTION OF PREFERRED EMBODIMENTS

Figure 1:
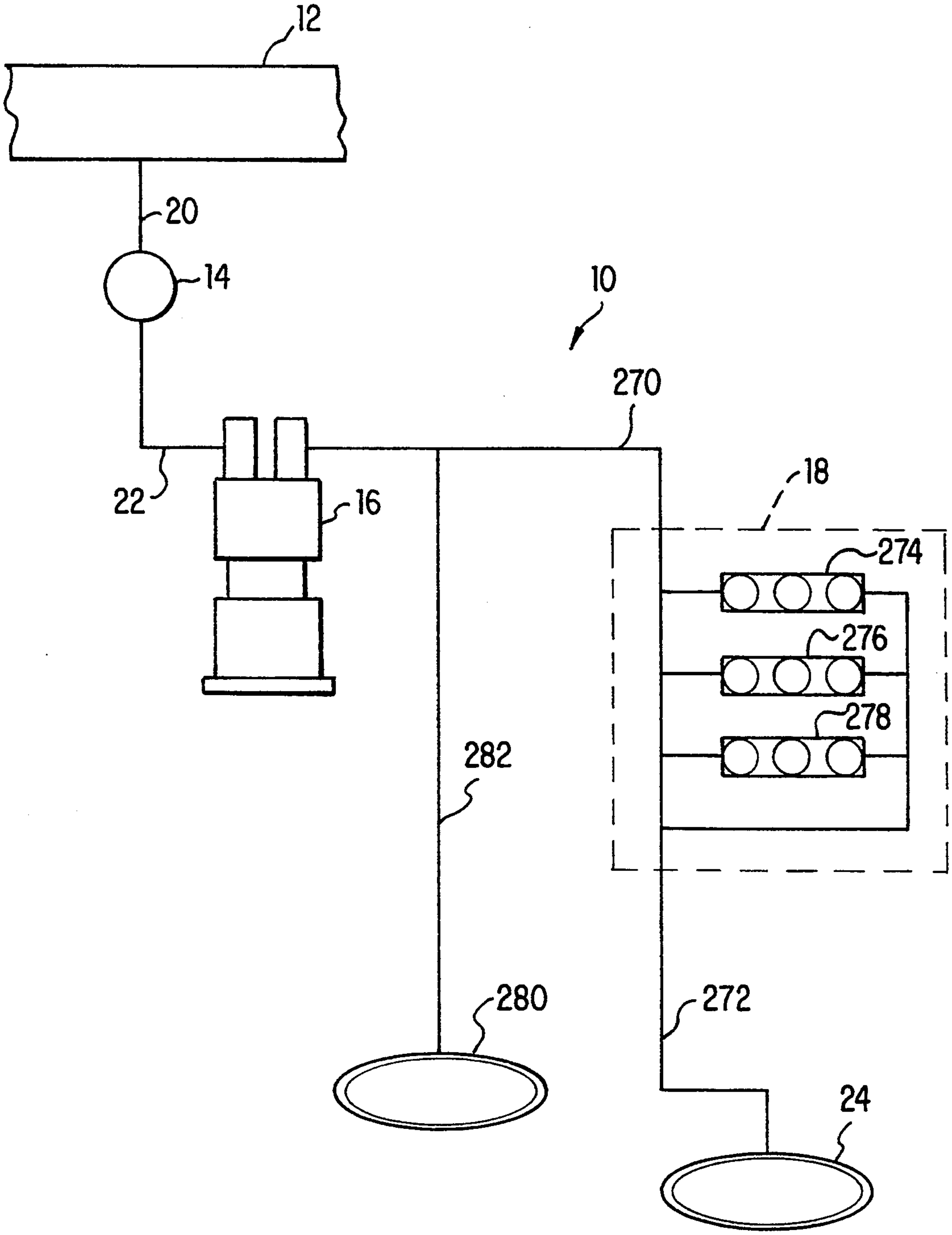
FIG. 1 is a schematic view of a refueling station constructed in accordance with a preferred embodiment of the present invention.

Referring now to the drawings, wherein like reference numerals indicate like elements, there is shown in FIG. 1 a refueling station 10 constructed in accordance with a preferred embodiment of the present invention. The refueling station 10 is connected to a natural gas pipeline 12, and includes a single desiccant adsorbent dryer 14, a compressor 16, and a storage system 18 (described in more detail below).

In operation, natural gas is withdrawn from the pipeline 12 and supplied to the dryer 14 through a supply conduit 20. The dryer 14 removes water from the gas, and the dried gas is sucked through a conduit 22 into the compressor 16. The compressor 16 raises the pressure of the natural gas from its relatively low pipeline pressure to a high storage pressure. The pipeline pressure may be within a range of from five pounds per square inch (psig) to three hundred psig. The storage pressure may be in the range of from about thirty-six hundred to five thousand psig, preferably thirty-six hundred to four thousand psig. The high pressure compressed natural gas is stored within the storage system 18 and is periodically fast filled into natural gas vehicle tanks, one of which is designated by reference numeral 24.

The dryer 14 contains desiccant material (not illustrated) that adsorbs moisture ($H_2O$) from the natural gas. Over time, as natural gas flows through the dryer 14, the desiccant material becomes progressively wetter. The desiccant material loses its effectiveness as it becomes wetter. Eventually, the desiccant material becomes saturated with moisture, and then the dryer 14 has to be regenerated. During regeneration, the compressor 16 is turned off and the dryer 14 is disconnected from the compressor 16 and the pipeline 12. Then, a hot, dry regenerating gas (such as heated nitrogen) is passed through the desiccant material. The hot regenerating gas absorbs moisture from the desiccant material and carries the moisture out of the dryer 14.

Figure 2:
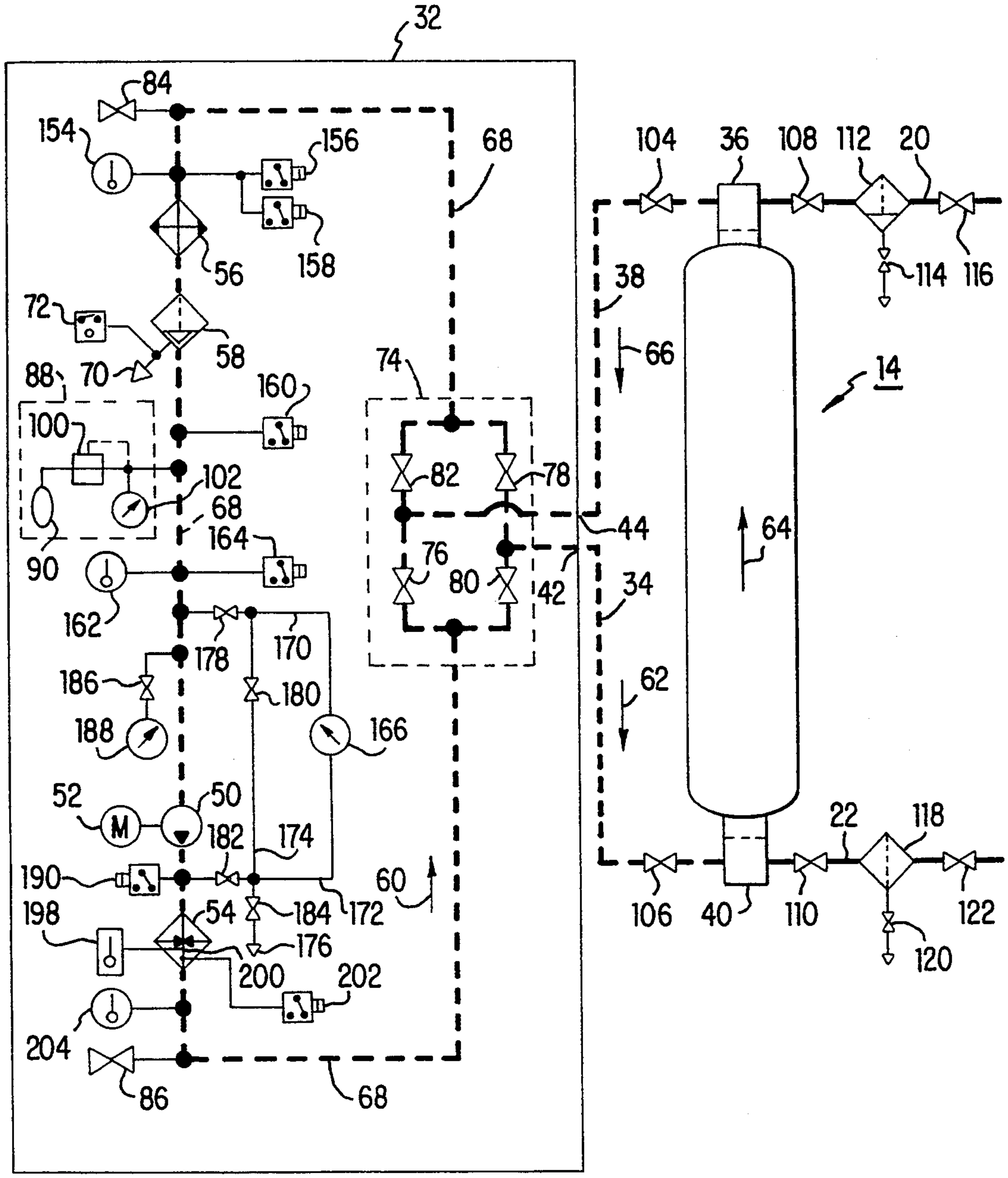
FIG. 2 is a schematic view of an adsorbent dryer and a mobile regeneration apparatus constructed in accordance with a preferred embodiment of the present invention.

A mobile regeneration apparatus 32 for regenerating the dryer 14 is illustrated schematically in FIG. 2. The regeneration apparatus 32 includes an outlet hose 34 for connection to the dryer outlet 40, and an inlet hose 38 for connection to the dryer inlet 36. The hoses 34, 38 are connected to the conduit system 68 by respective couplings 42, 44. Regenerating gas is circulated through the dryer 14 by a blower 50, which is operated by an electric motor 52. A heater 54 is provided downstream of the blower 50, and a cooler 56 and a separator 58 are provided upstream from the blower 50. The purpose of the heater 54 is to raise the temperature of the regenerating gas so that it will absorb moisture from the dryer 14. The cooler 56 reduces the temperature of the regenerating gas to condense the absorbed moisture. The condensed moisture is separated from the regenerating gas in the separator 58. The cooler 56, the separator 58, the blower 50, and the heater 54 are arranged in series along a conduit system 68.

The regenerating apparatus 32 operates in two sequential phases. There is a regenerating phase during which moisture is removed from the dryer 14 by hot, dry regenerating gas circulating through the conduit system 68 in a captive loop, and a subsequent cooling phase during which the dryer 14 is returned to its normal operating temperature.

During the regenerating phase, the heater 54 is turned on and the blower 50 causes hot regenerating gas to circulate in the direction of arrows 60, 62, 64, 66. The hot gas travels upwardly through the dryer 14 and desorbs moisture from the desiccant material. The resulting wet regenerating gas travels back into the regeneration apparatus 32 through the inlet hose 38 and is circulated into the cooler 56 through the conduit system 68. The cooler 56 lowers the temperature of the regenerating gas below its pressure dew point such that the absorbed water is condensed out.

The condensed water is drained out of the separator 58 through a separator sump 70. A separator sump high level switch 72 is provided for sounding an alarm in the event the drain becomes clogged. In particular, the switch 72 detects the presence of a high liquid level in the separator sump 70, and thereby detects a drain system failure. When the switch 72 is actuated, regeneration operations are automatically interrupted and a "Separator High Level" warning light 73 on panel 75 (FIG. 8) is illuminated.

The regenerating phase is completed when a sufficient amount of moisture has been removed from the dryer 14. Then, at the start of the cooling phase, a valve system 74 is actuated to redirect the regenerating gas in the direction opposite to the arrows 60, 62, 64, 66. During the cooling phase, the blower 50 is kept on and the heater 54 is turned off. Thus, the regenerating gas is circulated downwardly through the dryer 14 to rapidly cool the dryer 14 to its normal operating temperature.

The end of the regenerating phase may be automatically determined by monitoring the temperature of the regenerating gas within the conduit system 68 just upstream of the cooler 56. When the gas at this point reaches a predetermined high temperature, the heater 54 is turned off and the valve system 74 is actuated to reverse the direction of flow through the conduit system 68, as described in more detail below. The end of the cooling phase may be automatically signaled when the temperature of the gas within the conduit system 68 reaches a predetermined low temperature, as described in more detail below.

In an alternative embodiment of the invention, the dryer 14 may be cooled by disconnecting the regenerating apparatus 32 from the dryer 14 and allowing the heat of the regenerated dryer 14 to dissipate into the ambient atmosphere by convection.

The valve system 74 includes two cool operation valves 76, 78 and two hot operation valves 80, 82. During the regenerating phase, the hot operation valves 80, 82 are both open and the cool operation valves 76, 78 are both closed. During the cooling phase, the cool operation valves 76, 78 are both open and the hot operation valves 80, 82 are both closed.

Sweep ports 84, 86 are provided at opposite ends of the conduit system 68. The sweep ports 84, 86 are used before the start of the regeneration process to purge the closed loop conduit system 68 of any oxygen or natural gas.

An adsorbent bed of activated carbon (not illustrated) may be provided to remove mercaptans, hydrogen sulfide, and other odorous materials and pollutants from the purged regenerating gas. In a preferred embodiment of the invention, the adsorbent bed of activated carbon may be impregnated with copper oxide (CuO). The activated carbon bed is preferably located downstream of the condenser 58, either before or after the blower 50, but before the heater 54.

A reservoir system 88 is provided for resupplying regenerating gas into the conduit system 68. The reservoir system 88 includes a reservoir 90 and a pressure regulator 100 for supplying regenerating gas from the reservoir 90 into the conduit system 68. A pressure gauge 102 is provided for monitoring the pressure of the regenerating gas admitted into the conduit system 68. In a preferred embodiment of the invention, the regenerating gas is nitrogen, and the nitrogen within the conduit system 68 during use is maintained by the regulator 100 at a pressure of approximately ten pounds per square inch.

As illustrated in detail in FIG. 2, valves 104, 106 are provided for closing off the opposite ends 36, 40 of the desiccant dryer 14 during normal drying operations. Control valves 108, 110 are provided for disconnecting the dryer 14 from the pipeline 12 and the compressor 16 during use of the regeneration apparatus 32. Between the control valve 108 and the pipeline 12, there is a coalescing prefilter 112 with a drain valve 114. Another valve 116 is provided for isolating the prefilter 112 from the pipeline 12. A particulate afterfilter 118 and an associated drain valve 120 are located between the lower control valve 110 and the compressor 16. The afterfilter 118 can be isolated from the compressor 16 by an isolation valve 122.

An advantageous feature of the invention is that dryers 14 located at a plurality of remotely located refueling stations 10 can all be regenerated by just one regeneration apparatus 32. With the present invention, there is no need to provide a separate regenerating system for each refueling station 10.

As illustrated in FIGS. 3–7, the mobile regeneration apparatus 32 has a compact construction and may be fully self-contained and supported on a skid 124. The skid 124 has openings 126, 128 for receiving the tongues of a fork lift truck. Thus, after regenerating the dryer 14 at one refueling station 10, the apparatus 32 can be loaded onto a trailer and transported to a second refueling station 10 to regenerate a dryer 14 at the second station 10. The regeneration apparatus 32 may then be transported to a third station 10, and so on. Eventually, the dryer 14 at the first station 10 will again become saturated, and the mobile regeneration apparatus 32 would then be returned to the first station 10.

A housing 130 is provided for enclosing the blower 50, motor 52, heater 54 and cooler 56. The housing 130 shields the interior elements of the regeneration apparatus 32 from damage, and provides safety for the user. The housing 130 has a front wall 132, two side walls 134, 136, a rear wall 138, and a roof 140. Openings 148, 150, 152 are provided at the top of the front wall 132 and through the right side wall 136 for venting air in and out of the housing 130. For clarity of illustration, the left side wall 134 is not shown in FIG. 4, the rear wall 138 is not shown in FIG. 6, and the roof 140 is not shown in FIG. 7.

An advantageous feature of the invention is that the regeneration apparatus 32 has an automated, self-contained control system. The control system includes a temperature gauge 154 (FIG. 2) for monitoring the temperature of the regenerating gas at a point just before the gas enters the cooler 56. A heat termination temperature switch is designated by reference numeral 156. A cooling termination temperature switch is designated by reference numeral 158. A low ambient temperature switch 160 is provided downstream from the separator 58. A cooler discharge temperature gauge and a cooler high outlet temperature switch are designated by reference numerals 162 and 164, respectively.

The operation of the blower 50 is monitored by a differential pressure gauge 166. The pressure gauge 166 is connected to the conduit system 68 at opposite sides of the blower 50 by signal conduits 170, 172. A separate conduit 174 is provided for bypassing the gauge 166, and yet another conduit 176 is provided for bleeding fluid from the gauge 166. Suitable valves 178, 180, 182, 184 are provided for selectively operating the gauge 166.

A block and bleed valve 186 and a corresponding purge pressure gauge 188 are provided between the signal conduits 170, 172.

Immediately downstream of the blower 50 there is a blower high outlet temperature switch 190. A heater temperature alarm gauge 198 is connected to a thermocouple 200 located within the heater 54, and a heater set point temperature switch 202 is provided downstream of the heater 54. A heater outlet temperature gauge 204 is provided downstream from the heater set point temperature switch 202.

Figure 3:
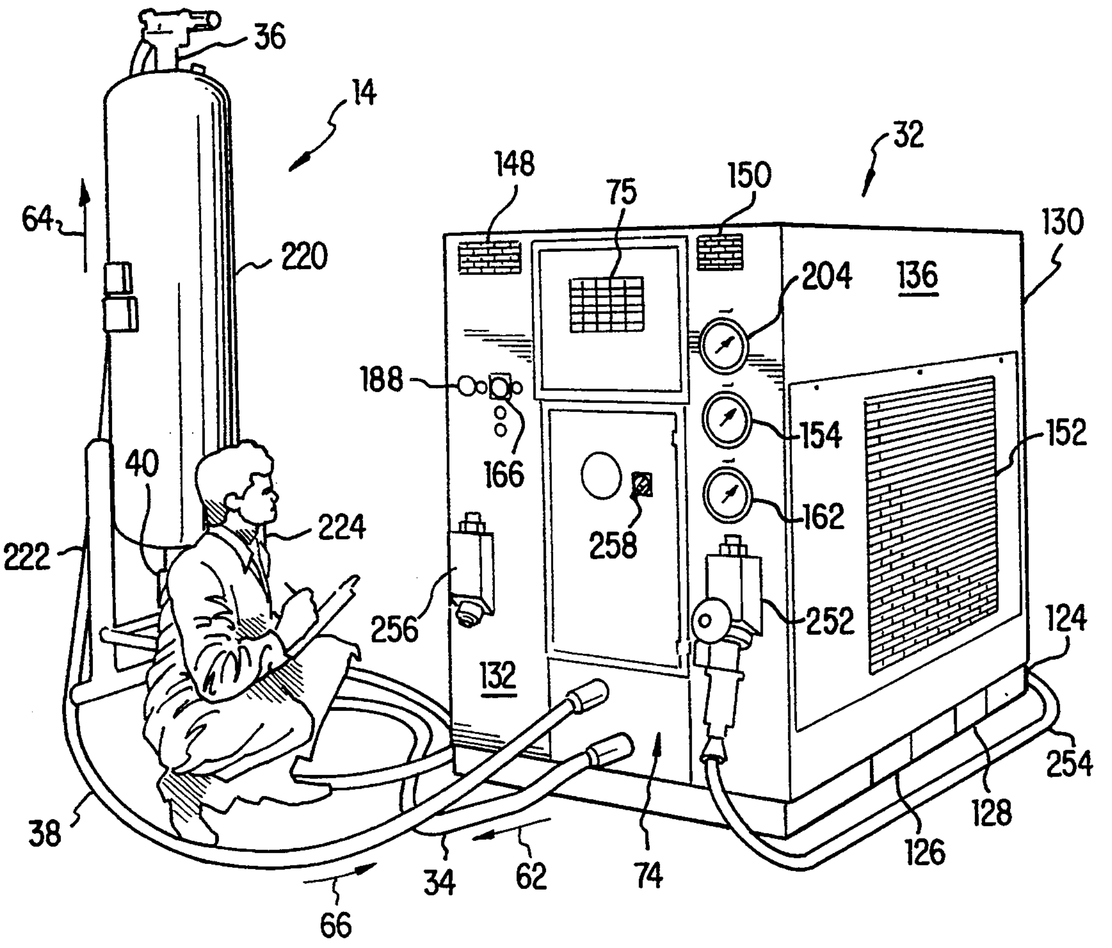
FIG. 3 is a perspective view of the adsorbent dryer and mobile regeneration apparatus of FIG. 2.
Figure 4:
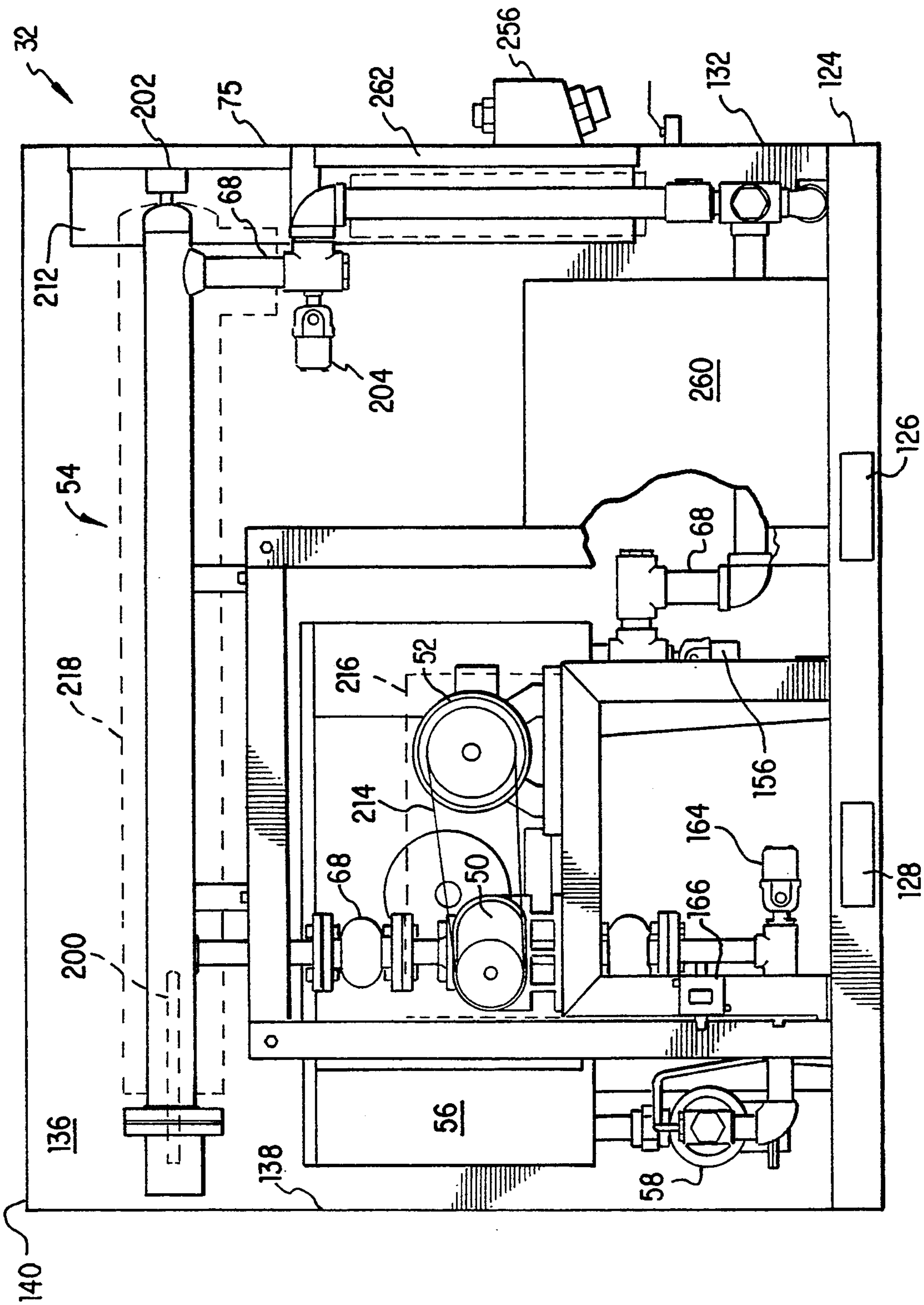
FIG. 4 is a side elevational view of the regeneration apparatus of FIG. 2.
Figure 5:
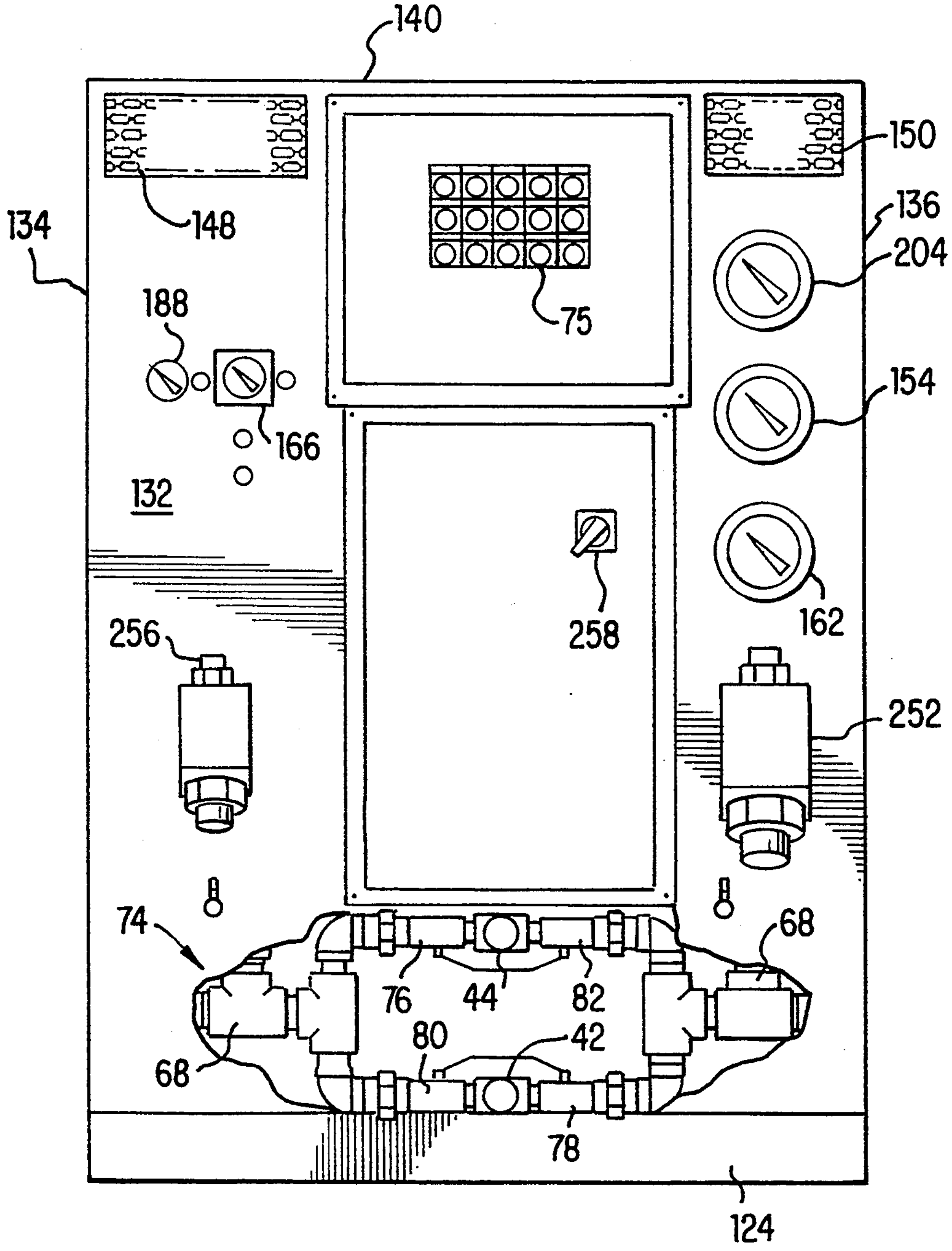
FIG. 5 is a front elevational view of the regeneration apparatus of FIG. 2.
Figure 6:
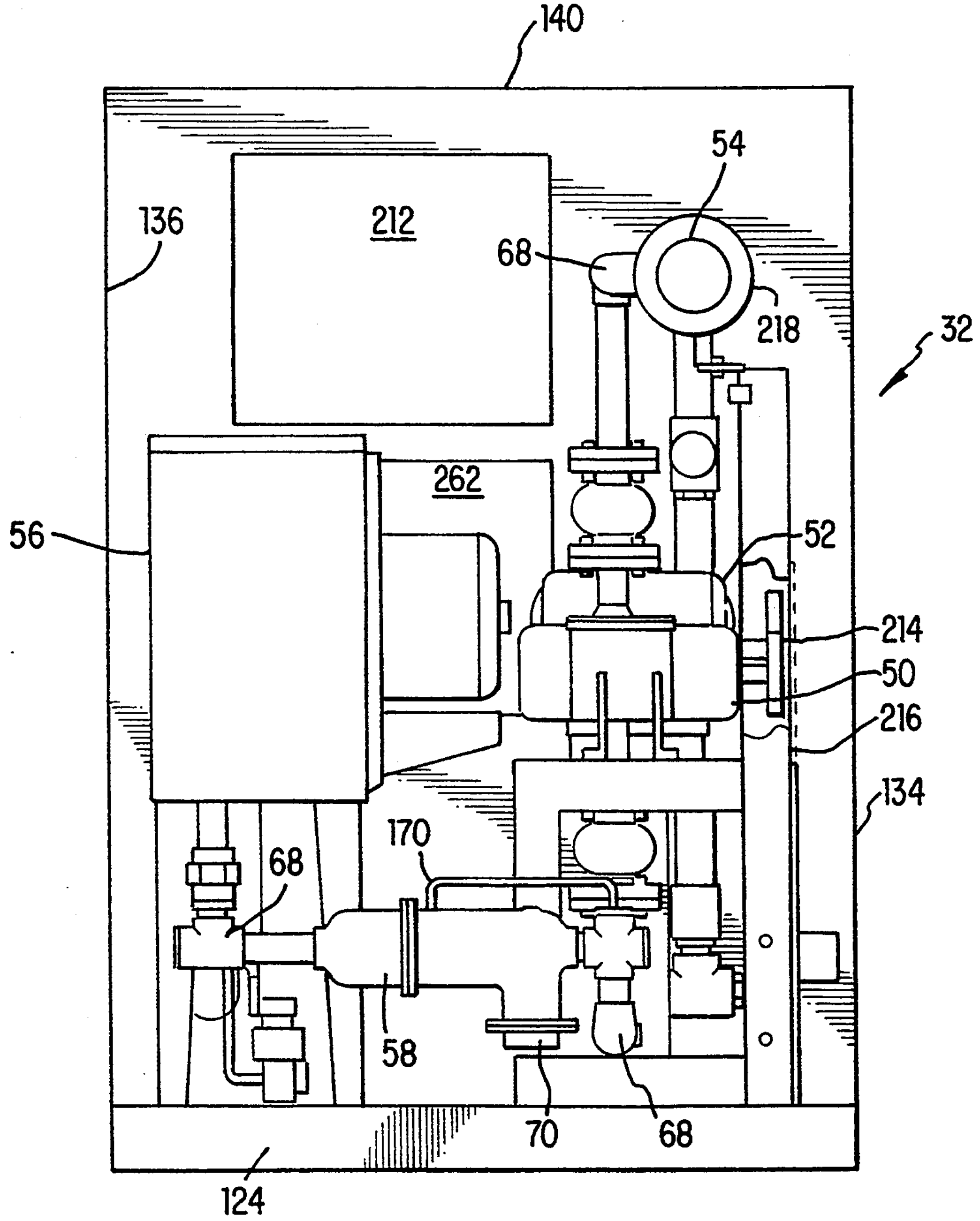
FIG. 6 is a rear elevational view of the regeneration apparatus of FIG. 2.
Figure 7:
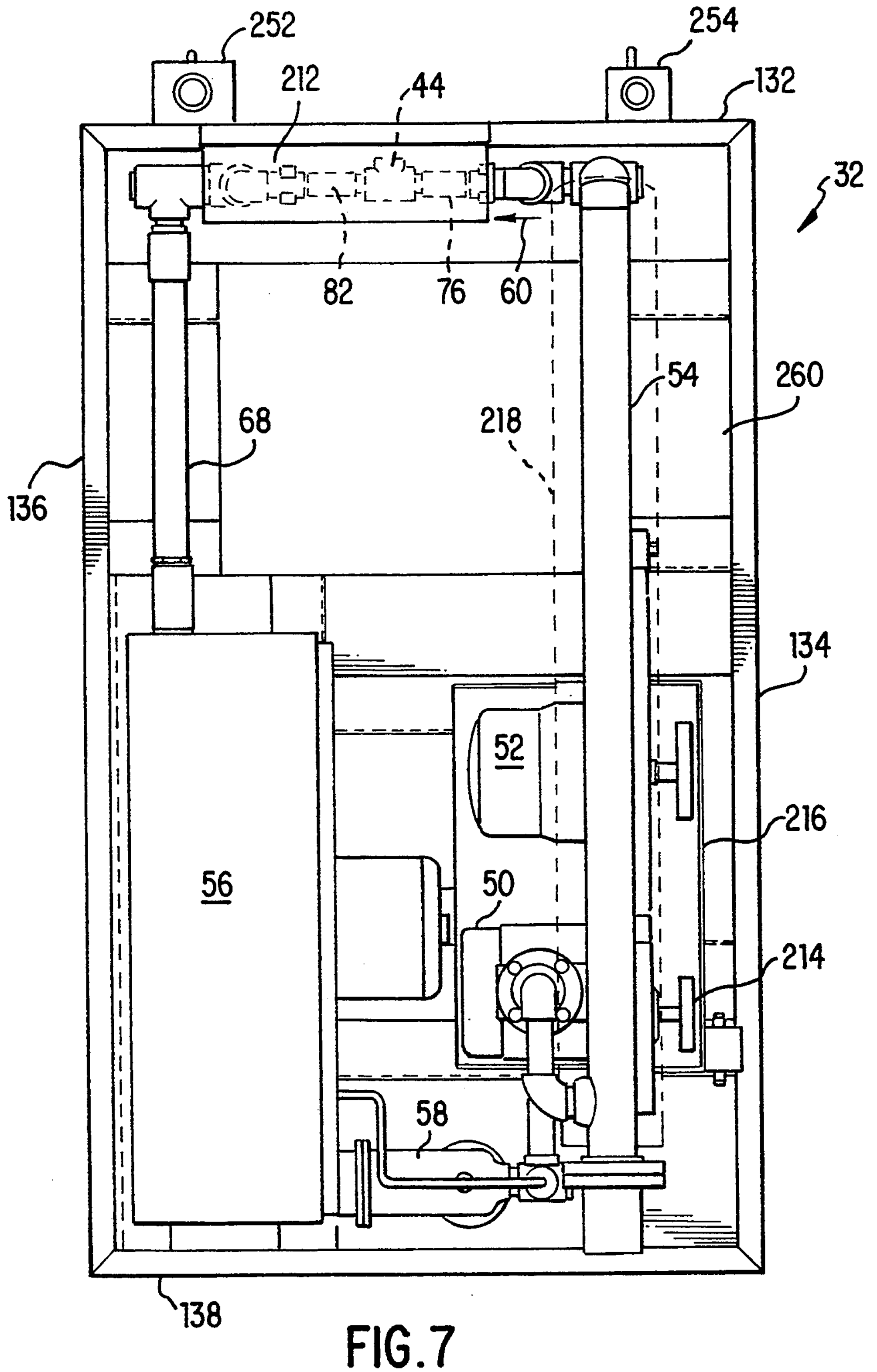
FIG. 7 is a plan view of the regeneration apparatus of FIG. 2.
Figure 8:
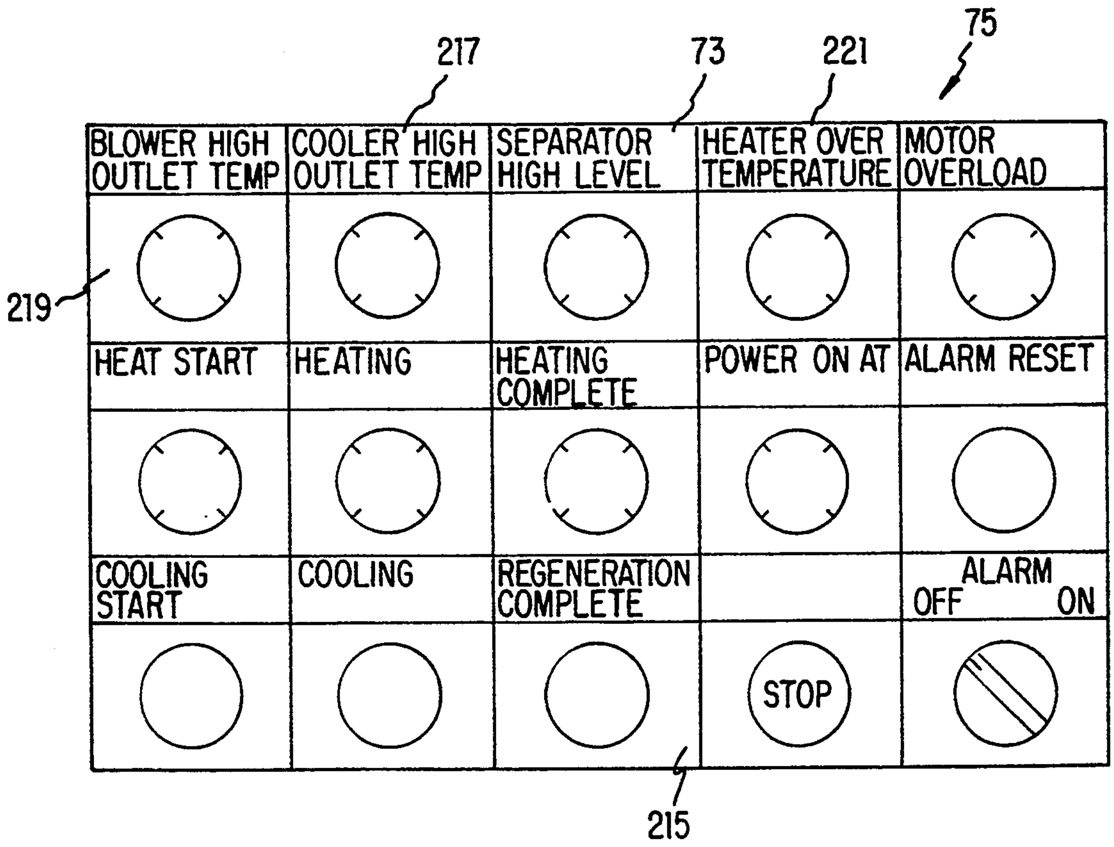
FIG. 8 is an enlarged view of a control panel for the regeneration apparatus of FIG. 2.

The control system is monitored and accessed by the user by means of the control panel 75 (FIGS. 3, 5 and 8). The panel 75 may be mounted on a low tension box 212 (FIG. 4) located on the front wall 132 of the housing 130. The pressure and temperature gauges 188, 166, 204, 154, 162 are also located on the front wall 132, as illustrated in FIGS. 3 and 5, so as to be easily visible by the user.

The heat termination temperature switch 156 detects a temperature rise in the gas stream exiting the adsorbent desiccant bed. A predetermined increase in the gas temperature at this point indicates that substantially all adsorbed moisture has been stripped from the adsorbent bed. When the heat termination temperature switch 156 is actuated, the blower 50 and the heater 54 are automatically turned off and a "Heating Complete" indicator light on the panel 75 is illuminated.

The cooling termination temperature switch 158 detects a temperature drop in the gas stream exiting the adsorbent bed, and thereby detects the completion of the bed cool down operation. When the cooling termination temperature switch 158 is actuated, the blower 50 is turned off and a "Regeneration Complete" indicator light 215 on the panel 75 is illuminated.

The low ambient temperature switch 160 is actuated when the ambient air temperature is less than a predetermined minimum temperature. When the low ambient temperature switch 160 is actuated, the condenser cooler fan motor for the cooler 56 is turned off to prevent moisture freeze-up.

The cooler high outlet temperature switch 164 is actuated in the event the cooler 56 fails to lower the temperature of the regeneration gas. When the cooler high outlet temperature switch 164 is actuated, all regeneration operations are stopped and a "Cooler High Outlet Temp" warning light 217 on panel 75 is illuminated.

The blower high outlet temperature switch 190 is actuated when the temperature of the gas exiting the blower 50 exceeds a predetermined high temperature. The increased temperature of the gas may be due to an increased temperature of the gas entering the blower 50. The increased temperature at the outlet from the blower 50 may also be due to a high pressure differential across the blower 50. When the blower high outlet temperature switch 190 is actuated, all regeneration operations are stopped and a "Blower High Outlet Temp" warning light 219 is illuminated.

The heater set point temperature switch 202 is actuated when the temperature of the regeneration gas exiting the heater 54 exceeds a predetermined maximum temperature. When the heater set point temperature switch 202 is actuated, a "Heater Over Temperature" warning light 221 is illuminated.

In a preferred embodiment of the invention, the gas cooler 56 may be a fin and tube type air-cooled regeneration loop gas heat exchanger.

The gas blower 50 may be a heavy duty, positive displacement rotary lobe type blower. An anti-sparking V-belt drive system 214 for driving the blower 50 is shown in FIG. 4. The V-belt drive system 214 may be covered by a suitable guard 216.

The gas heater 54 is preferably an incoloy sheathed low watt density heater with an insulated heater housing 218.

As illustrated in FIG. 3, the adsorbent dryer 14 includes a cylindrical metal shell 220 for containing the adsorbent desiccant material. The shell 220 may be vertically arranged and supported on legs 222, 224. The legs 222, 224 may be fixed to the ground.

The absorbent material contained within the dryer shell 220 should be selected for: (1) high moisture capacity at low inlet gas humidity; (2) minimum co-adsorption of heavier gas constituents; and (3) minimum co-adsorption of gas odorants. The desiccant material may be, for example, approximately one hundred pounds of commercially available Davison Type 4A Molecular Sieve.

Two hundred eight volt electrical power may be supplied to the regeneration apparatus 32 through an electric receptacle 252, which is connectable to a power cable 254. A four hundred eighty volt power receptacle 256 is also provided. A transformer switch 258 for selectively switching between two hundred eight and four hundred eighty volt operations may be conveniently located on the front wall 132 of the apparatus 32. The transformer 260 (FIG. 4) may be located immediately behind the high tension box 262 containing the transformer switch 258.

Referring again to FIG. 1, an advantageous feature of the present invention is that the desiccant dryer 14 is located upstream from the compressor 16 (in the illustrated embodiment, between the pipeline 12 and the compressor 16). This is important because it avoids the problem of pulsations from the compressor 16 degrading the desiccant material in the dryer 14. It also minimizes condensation within the compressor 16. Moreover, the only location where the pressure and flow of natural gas are fairly constant is between the pipeline 12 and the compressor 16. Therefore, this is the optimum location for the dryer 14.

The illustrated refueling station 10 is arranged for both fast fill and slow fill operations. Fast fill refueling operations are accomplished through the storage system 18. The storage system 18 is connected to the compressor 16 by a conduit 270, and the vehicle storage tanks 24 are successively connected to the storage system 18 by a conduit 272. Each vehicle tank 24 may be fast filled in three to five minutes.

The fast fill storage system 18 includes a cascade of storage vessels arranged in three banks 274, 276, 278 in a manner well known to the art. The storage vessels of each bank 274, 276, 278 are connected together so that the entire storage system 18 acts as one large container. The banks 274, 276, 278 are separated by automatic switching valves (not illustrated) and valve sequencing is controlled automatically by a sequencing control panel (not illustrated), in a manner well known to the art. The cascaded storage system 18 shown in FIG. 1 provides more available compressed gas storage capacity than a correspondingly sized single bulk storage vessel.

Slow fill refueling operations are done by straight compression, with the vehicle tank 280 connected directly to the compressor 16 by a conduit 282. A slow fill refueling operation generally takes several hours and is usually done overnight.

The need to regenerate the dryer 14 may be accomplished by testing the moisture content of gas exiting the dryer, or by using a moisture monitor and alarms system constructed in accordance with U.S. Pat. No. 4,552,570. The latter system may employ a capacitive probe located in the adsorbent bed within the dryer 14 to directly measure the extent to which the dryer 14 is saturated with moisture.

The above description and drawings are only illustrative of preferred embodiments which can achieve the objects, features, and advantages of the present invention. It is not intended that the invention be limited to the embodiments shown and described herein. Modifications of the present invention which come within the spirit and scope of the following claims are to be considered part of the present invention.

What is claimed as new and desired to be protected by Letters Patent of the United States is:

1. A method of handling gas, said method comprising the steps of:
   - flowing a first gas through a first adsorbent dryer, using said dryer to dry said first gas, and subsequently compressing said first gas into a first storage vessel;
   - flowing a second gas through a second adsorbent dryer, using said second adsorbent dryer to dry said second gas, and subsequently compressing said second gas into a second storage vessel, said second dryer being remote from said first dryer; and
   - using a mobile regeneration apparatus to regenerate said first and second dryers.

2. The method of claim 1, wherein said first gas is natural gas, and wherein said step of using said mobile regeneration apparatus includes the step of using an adsorbent bed of activated carbon impregnated with copper oxide to remove material from purged regenerating gas.

3. The method of claim 2, wherein said first gas is stored within said first storage vessel at a pressure within a range of from about thirty-six hundred to five thousand pounds per square inch.

4. The method of claim 3, wherein said first gas is dried to a pressure dew point of minus twenty degrees Fahrenheit at thirty-six hundred pounds per square inch.

5. The method of claim 4, further comprising the step of moving said regeneration apparatus from said first dryer to said second dryer.

6. A mobile regeneration apparatus for regenerating an adsorbent dryer, said apparatus comprising:

a conduit system for connecting said apparatus to the adsorbent dryer;

a blower for causing regenerating fluid to flow through the adsorbent dryer;

a heater for heating the regenerating fluid, said heater being connected to said blower by said conduit system;

a cooler for cooling the regenerating fluid, said cooler being connected to said heater by said conduit system; and a separator for removing water from the regenerating fluid, said separator being located between said cooler and said heater, said separator being connected to said heater and said cooler by said conduit system.

7. The mobile regeneration apparatus of claim 6, further comprising a portable skid, said blower, said heater, said cooler, and said separator being located on said skid.

8. The mobile regeneration apparatus of claim 7, further comprising a motor for operating said blower, said motor being located on said skid.

9. The mobile regeneration apparatus of claim 8, wherein said skid includes openings for receiving fork lift tongues.

10. The mobile regeneration apparatus of claim 8, further comprising a housing for enclosing said heater, said blower, said cooler, and said separator.

11. The mobile regeneration apparatus of claim 5, further comprising a control system for operating and monitoring said apparatus.

12. The mobile regeneration apparatus of claim 11, wherein said control system includes a control panel, said control panel being located on said housing.

13. The mobile regeneration apparatus of claim 8, further comprising a valve system for redirecting the regenerating fluid through the dryer to cool the dryer, said valve system being located within said conduit system.

14. The mobile regeneration apparatus of claim 6, further comprising hoses for connecting said blower to the adsorbent dryer.

15. A system for refueling natural gas vehicles, said system comprising:

a first refueling station including a storage vessel, a compressor for compressing natural gas into said storage vessel, and an adsorbent dryer for drying the natural gas, said compressor being located between said adsorbent dryer and said storage vessel, said storage vessel being connected to said compressor by a first conduit, said compressor being connected to said dryer by a second conduit;

a second refueling station including a storage vessel, an adsorbent dryer, and a compressor, said second refueling station being remote from said first refueling station, said storage vessel of said second refueling station being connected to said compressor of said second refueling station by a third conduit, said compressor of said second refueling station being connected to said adsorbent dryer of said second refueling station by a fourth conduit; and a mobile regeneration apparatus for regenerating said adsorbent dryers.

16. The system of claim 15, wherein said regeneration apparatus comprises:

a conduit system for connecting said apparatus to said first and second refueling stations;

a blower for circulating regenerating fluid through said dryers;

a heater for heating the regenerating fluid, said heater being connected to said blower by said conduit system;

a cooler for cooling the regenerating fluid, said cooler being connected to said heater by said conduit system; and a separator for removing water from the regenerating fluid, said separator being located between said cooler and said heater, said separator being connected to said heater and said cooler by said conduit system.

17. The system of claim 16, wherein said mobile regeneration apparatus includes a portable skid, with said blower, said heater, said cooler, and said separator being located on said skid.

18. The system of claim 17, wherein said mobile regeneration apparatus includes a control system for operating and monitoring said apparatus.

19. The system of claim 17, wherein said mobile regeneration apparatus includes a valve system for cooling said adsorbent dryers, said valve system being located within said conduit system.

20. The system of claim 17, wherein said mobile regeneration apparatus includes a housing for enclosing said blower, said heater, said cooler, and said separator.

* * * * *

US005350442B1

REEXAMINATION CERTIFICATE (3114th)

United States Patent [19]

Thelen et al.

[11] B1 5,350,442

[45] Certificate Issued Jan. 28, 1997

[54] GAS HANDLING SYSTEM AND ADSORBENT DRYER REGENERATION APPARATUS

[75] Inventors: John E. Thelen, Ocala; Sundar R. Mylavarapu, Gainesville, both of Fla.

[73] Assignee: Pneumatic Products Corp., Ocala, Fla.

Reexamination Request:
No. 90/004,097, Jan. 5, 1996

Reexamination Certificate for:

| | |
|---|---|
| Patent No.: | **5,350,442** |
| Issued: | **Sep. 27, 1994** |
| Appl. No.: | **103,002** |
| Filed: | **Aug. 6, 1993** |

[51] Int. Cl.[6] .......... B01D 53/04

[52] U.S. Cl. .......... 95/115; 95/15; 95/17; 95/18; 95/124; 96/112; 96/113; 96/117; 96/128; 96/133; 55/356

[58] Field of Search .......... 95/10, 11, 17–19, 95/114, 115, 117, 123–126; 96/112, 113, 117, 128, 133, 144; 55/356

[56] References Cited

U.S. PATENT DOCUMENTS 3,384,976 5/1968 Westeren .......... 96/144 X

OTHER PUBLICATIONS

Xebec NGV Dryers (34 pages), May, 1992.

Xebec, Inc., Sales Quotation to Diversified Pneumatics Tech, Apr. 10, 1992.

CNG Series, "Captive Blower Purge Purification Systems", Mar., 1991.

Pioneer Air Systems, Inc., Drawing No. 30296–M1, Rev. A, Sep. 6, 1991.

Lectrodryer, "Lectro–Breather . . . tank vent dryer for safeguarding oil and chemical from moisture", 1982.

S. Mylavarapu, "Are High Pressure Desiccant Dryers Right for Drying CNG Used in NGV's?", Nov., 1991.

Drying Compressed Natural Gas (12 pages), Sahara NGV Division, Henderson Engineering Co., Inc., presented at the Natural Gas Expo, Newport Beach, Ga., Reference No. CNG.1, (undated).

*Primary Examiner*—Robert H. Spitzer

[57] ABSTRACT

A mobile regeneration apparatus is provided for regenerating dryers. The regeneration apparatus may be used to regenerate single tower desiccant dryers located at natural gas vehicle refueling stations. For optimum performance, each dryer may be located upstream of a respective compressor.

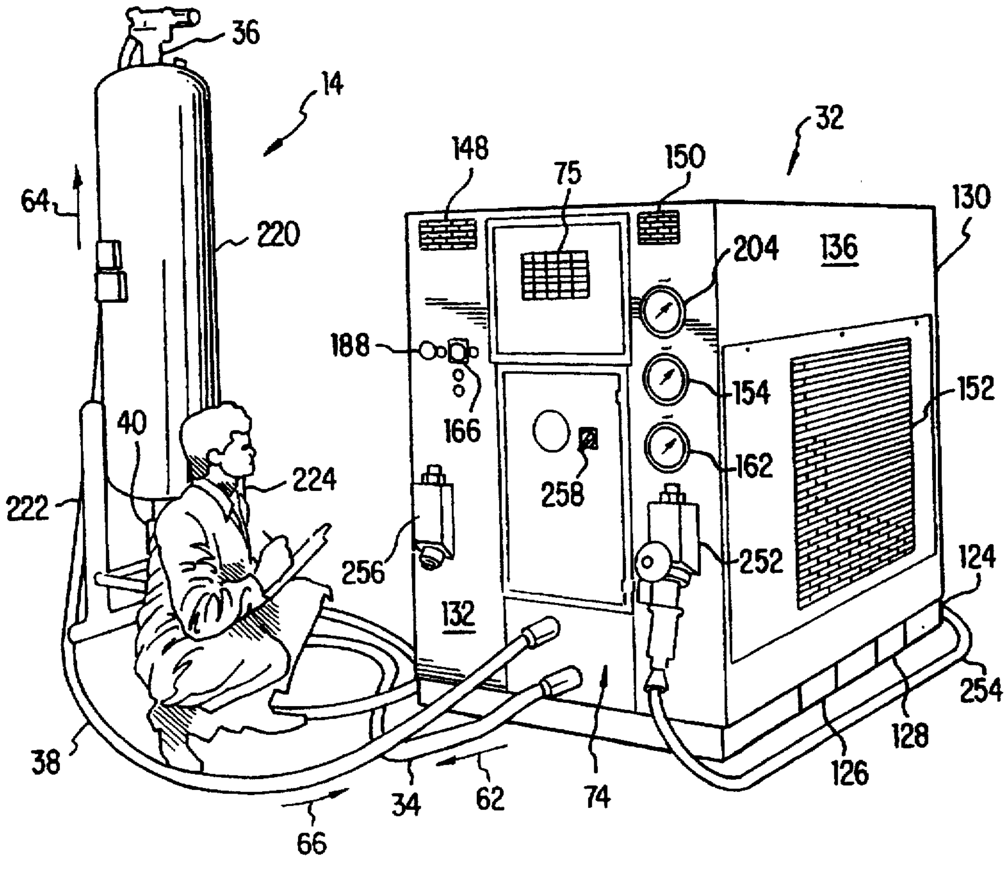

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 and 14–16 is confirmed.

Claims 8, 11 and 17 are determined to be patentable as amended.

Claims 9, 10, 12, 13 and 18–20, dependent on an amended claim, are determined to be patentable.

New claims 21–63 are added and determined to be patentable.

8. [The mobile regeneration] *A mobile regeneration apparatus for regenerating an adsorbent dryer, said apparatus comprising:*

*a conduit system for connecting said apparatus to the adsorbent dryer;*

*a blower for causing regenerating fluid to flow through the adsorbent dryer;*

*a heater for heating the regenerating fluid, said heater being connected to said blower by said conduit system;*

*a cooler for cooling the regenerating fluid, said cooler being connected to said heater by said conduit system; and*

*a separator for removing water from the regenerating fluid, said separator being located between said cooler and said heater, said separator being connected to said heater and said cooler by said conduit system; and*

*wherein said apparatus further comprises a portable skid, said blower, said heater, said cooler, and said separator being located on said skid; and*

*wherein said* apparatus [of claim 7,] further [comprising] *comprises* a motor for operating said blower, said motor being located on said skid.

11. The mobile regeneration apparatus of claim [5] *10*, further comprising a control system for operating and monitoring said apparatus.

17. [The system of claim 16,] *A system for refueling natural gas vehicles, said system comprising:*

*a first refueling station including a storage vessel, a compressor for compressing natural gas into said storage vessel, and an adsorbent dryer for drying the natural gas, said compressor being located between said adsorbent dryer and said storage vessel, said storage vessel being connected to said compressor by a first conduit, said compressor being connected to said dryer by a second conduit;*

*a second refueling station including a storage vessel, an adsorbent dryer, and a compressor, said second refueling station being remote from said first refueling station, said storage vessel of said second refueling station being connected to said compressor of said second refueling station by a third conduit, said compressor of said second refueling station being connected to said adsorbent dryer of said second refueling station by a fourth conduit; and*

*a mobile regeneration apparatus for regenerating said adsorbent dryers; and*

*wherein said regeneration apparatus comprises:*

*a conduit system for connecting said apparatus to said first and second refueling stations;*

*a blower for circulating regenerating fluid through said dryers;*

*a heater for heating the regenerating fluid, said heater being connected to said blower by said conduit system;*

*a cooler for cooling the regenerating fluid, said cooler being connected to said heater by said conduit system; and*

*a separator for removing water from the regenerating fluid, said separator being located between said cooler and said heater, said separator being connected to said heater and said cooler by said conduit system; and* wherein said mobile regeneration apparatus includes a portable skid, with said blower, said heater, said cooler, and said separator being located on said skid.

*21. The method of claim 1, further comprising the step of purging said mobile regeneration apparatus, said purging step occurring prior to said step of using said mobile regeneration apparatus to regenerate said first and second dryers.*

*22. The method of claim 21, wherein said step of purging said regeneration apparatus includes the step of purging a closed loop conduit system of oxygen and natural gas.*

*23. The method of claim 21, wherein said step of using said mobile regeneration apparatus to regenerate said first and second dryers includes the step of flowing nitrogen gas through said first and second dryers, and wherein said nitrogen gas in said dryers is maintained at a pressure of approximately ten pounds per square inch.*

*24. A method of handling gas, said method comprising the steps of:*

*flowing a first gas through a first adsorbent dryer, using said dryer to dry said first gas, and subsequently compressing said first gas into a first storage vessel;*

*flowing a second gas through a second adsorbent dryer, using said second adsorbent dryer to dry said second gas, and subsequently compressing said second gas into a second storage vessel, said second dryer being remote from said first dryer; and*

*using a mobile regeneration apparatus to regenerate said first and second dryers; and*

*wherein said method further comprises the step of purging said mobile regeneration apparatus, said purging step occurring prior to said step of using said mobile regeneration apparatus to regenerate said first and second dryers; and*

*wherein said step of purging said regeneration apparatus includes the step of purging a closed loop conduit system of oxygen and natural gas; and*

*wherein said step of using said mobile regeneration apparatus to regenerate said first and second dryers includes the step of flowing nitrogen gas through said first and second dryers.*

*25. The method of claim 24, wherein said mobile regeneration apparatus has a compact construction.*

*26. The method of claim 25, further comprising the step of using a vehicle to transport said mobile regeneration*

*apparatus from said first adsorbent dryer to said second adsorbent dryer.*

*27. The method of claim 26, wherein said vehicle includes a trailer, and wherein said method further comprises the step of loading said mobile regeneration apparatus onto said trailer.*

*28. The method of claim 27, wherein said first and second adsorbent dryers contain an adsorbent material which minimizes co-adsorption of gas odorants.*

*29. The method of claim 28, wherein said first gas is natural gas, and wherein said step of using said mobile regeneration apparatus includes the step of using an adsorbent bed of activated carbon impregnated with copper oxide to remove material from said purged gas.*

*30. The method of claim 28, wherein said first gas is stored within said first storage vessel at a pressure within a range from about thirty-six to five thousand pounds per square inch.*

*31. The method of claim 30, wherein said first gas is dried to a pressure dew point of minus twenty degrees Fahrenheit at thirty-six hundred pounds per square inch.*

*32. The mobile regeneration apparatus of claim 6, further comprising means for purging said conduit system before said mobile regeneration apparatus is used to regenerate the adsorbent dryer.*

*33. The mobile regeneration apparatus of claim 32, wherein said apparatus includes a closed loop system, and wherein said conduit system is an element of said closed loop system, and wherein said purging means includes means for purging said closed loop system of oxygen and natural gas.*

*34. The mobile regeneration apparatus of claim 33, further comprising a source of nitrogen gas connected to said closed loop system.*

*35. The mobile regeneration apparatus of claim 34, wherein said mobile regeneration apparatus has a compact construction for being transported on a vehicle to a second dryer remote from the adsorbent dryer.*

*36. The mobile regeneration apparatus of claim 35, wherein the vehicle includes a trailer for transporting said mobile regeneration apparatus.*

*37. The mobile regeneration apparatus of claim 36, further comprising an adsorbent bed of activated carbon impregnated with copper oxide to remove material from purged gas.*

*38. The mobile regeneration apparatus of claim 36, further comprising a portable skid, said blower, said heater, said cooler, and said separator being located on said skid.*

*39. The mobile regeneration apparatus of claim 38, further comprising a motor for operating said blower, said motor being located on said skid.*

*40. The mobile regeneration apparatus of claim 39, wherein said skid includes openings for receiving fork lift tongues.*

*41. The mobile regeneration apparatus of claim 39, further comprising a housing for enclosing said heater, said blower, said cooler, and said separator.*

*42. The mobile regeneration apparatus of claim 39, further comprising a control system for operating and monitoring said apparatus.*

*43. The mobile regeneration apparatus of claim 42, wherein said control system includes a control panel, said control panel being located on a housing.*

*44. The mobile regeneration apparatus of claim 43, further comprising a valve system for redirecting the regenerating fluid through the adsorbent dryer to cool the adsorbent dryer, said valve system being located on said skid within said conduit system.*

*45. The mobile regeneration apparatus of claim 39, further comprising hoses for connecting said blower to the adsorbent dryer.*

*46. The system of claim 15, further comprising means for purging said mobile regeneration apparatus before said mobile regeneration apparatus is used to regenerate said dryers.*

*47. The system of claim 46, wherein said apparatus includes a closed loop conduit system, and wherein said means for purging said mobile regeneration apparatus includes means for purging said closed loop conduit system of oxygen and natural gas.*

*48. A system for refueling natural gas vehicles, said system comprising:*

- *a first refueling station including a storage vessel, a compressor for compressing natural gas into said storage vessel, and an adsorbent dryer for drying the natural gas, said compressor being located between said adsorbent dryer and said storage vessel, said storage vessel being connected to said compressor by a first conduit, said compressor being connected to said dryer by a second conduit;*
- *a second refueling station including a storage vessel, an adsorbent dryer, and a compressor, said second refueling station being remote from said first refueling station, said storage vessel of said second refueling station being connected to said compressor of said second refueling station by a third conduit, said compressor of said second refueling station being connected to said adsorbent dryer of said second refueling station by a fourth conduit; and*
- *a mobile regeneration apparatus for regenerating said adsorbent dryers; and*
- *wherein said system further comprises means for purging said mobile regeneration apparatus before said mobile regeneration apparatus is used to regenerate said dryers; and*
- *wherein said apparatus includes a closed loop conduit system, and wherein said means for purging said mobile regeneration apparatus includes means for purging said closed loop conduit system of oxygen and natural gas; and*
- *wherein said purging means includes a source of nitrogen gas connected to said closed loop conduit system.*

*49. The system of claim 48, wherein said mobile regeneration apparatus has a compact construction for being transported on a vehicle to said adsorbent dryer of said second refueling station.*

*50. The system of claim 15, wherein said adsorbent dryers contain an adsorbent material which minimizes co-adsorption of gas odorants.*

*51. The system of claim 50, further comprising an adsorbent bed of activated carbon impregnated with copper oxide to remove material from purged gas.*

*52. The system of claim 49, wherein said regeneration apparatus comprises:*

- *a conduit system for connecting said apparatus to said first and second refueling stations;*
- *a blower for circulating regenerating fluid through said dryers;*
- *a heater for heating the regenerating fluid, said heater being connected to said blower by said conduit system;*
- *a cooler for cooling the regenerating fluid, said cooler being connected to said heater by said conduit system; and*

*a separator for removing water from the regenerating fluid, said separator being located between said cooler and said heater, said separator being connected to said heater and said cooler by said conduit system.*

*53. The system of claim 52, wherein said mobile regeneration apparatus includes a portable skid, with said blower, said heater, said cooler, and said separator being located on said skid.*

*54. The system of claim 53, wherein said mobile regeneration apparatus includes a control system for operating and monitoring said apparatus.*

*55. The system of claim 53, wherein said mobile regeneration apparatus includes a valve system for cooling said adsorbent dryers, said valve system being located within said conduit system.*

*56. The system of claim 53, wherein said mobile regeneration apparatus includes a housing for enclosing said blower, said heater, said cooler, and said separator.*

*57. The mobile regeneration apparatus of claim 35, further comprising a coalescing prefilter and drain valve located upstream from said cooler.*

*58. The mobile regeneration apparatus of claim 57, further comprising a particulate afterfilter and drain valve located downstream from said heater.*

*59. The mobile regeneration apparatus of claim 58, wherein said cooler is a fin and tube type air-cooled regeneration loop gas heat exchanger.*

*60. The mobile regeneration apparatus of claim 59, wherein said blower is a positive displacement rotary lobe type blower.*

*61. The system of claim 52, wherein said cooler is a fin and tube type air-cooled regeneration loop gas heat exchanger and said blower is a positive displacement rotary lobe type blower, and wherein said system further comprises a coalescing prefilter and drain valve located upstream from said cooler, and a particulate afterfilter and drain valve located downstream from said heater.*

*62. The system of claim 52, further comprising a first electric receptacle releasably connectable to a power cable, a second electric receptacle releasably connectable to a power cable and a transformer switch for selectively switching between said first and second electric receptacles.*

*63. The system of claim 62, wherein said first electric receptacle receives 208 volt electrical power and said second electric receptacle receives 480 volt electrical power.*

* * * * *